Jan. 29, 1924.

N. R. NELSON

LUG FOR WHEELS

Filed April 12, 1920

1,482,139

Witness:
E. Wilderson

Inventor:
Nicholas R. Nelson
By W. E. Jordinton
Attorney

Patented Jan. 29, 1924.

1,482,139

UNITED STATES PATENT OFFICE.

NICHOLAS R. NELSON, OF EAST MOLINE, ILLINOIS, ASSIGNOR TO DEERE & COMPANY, OF MOLINE, ILLINOIS, A CORPORATION OF ILLINOIS.

LUG FOR WHEELS.

Application filed April 12, 1920. Serial No. 373,106.

*To all whom it may concern:*

Be it known that I, NICHOLAS R. NELSON, a citizen of the United States, residing at East Moline, in the county of Rock Island and State of Illinois, have invented certain new and useful Improvements in Lugs for Wheels, of which the following is a specification, reference being had therein to the accompanying drawing.

My invention relates to wheels common to tractors, grain harvesters and other vehicles, in which lugs are employed for the purpose of ensuring proper traction in soft ground, and the object of my invention is to provide a lug which can be readily attached to a shallower lug already in place on a wheel, and which can be as readily detached when desired.

Referring to the drawings in which similar numerals indicate identical parts.

Figure 2:
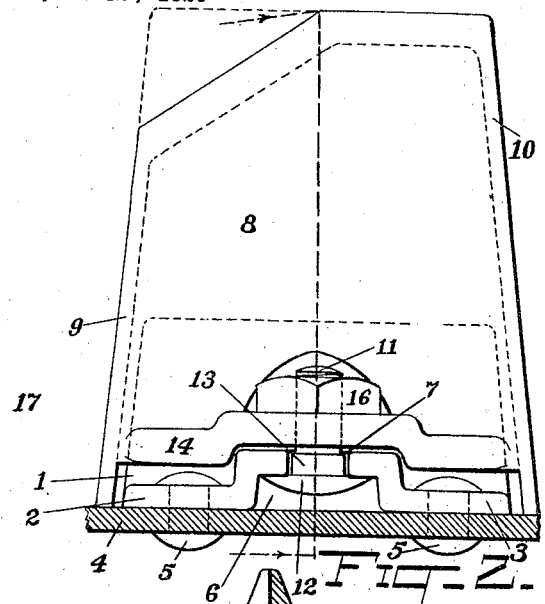
Figure 2 is an end view of Figure 1 but showing my improved lug secured in place over the shallow lug.
Figure 1:
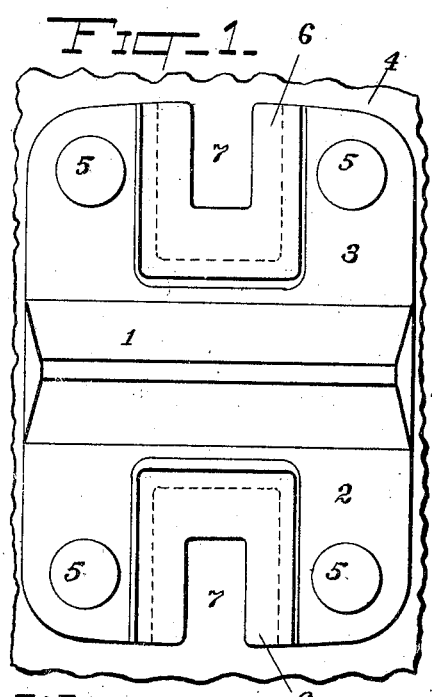
Figure 1 is a plan view of a shallow lug riveted to a fragment of a wheel tire.
Figure 3:
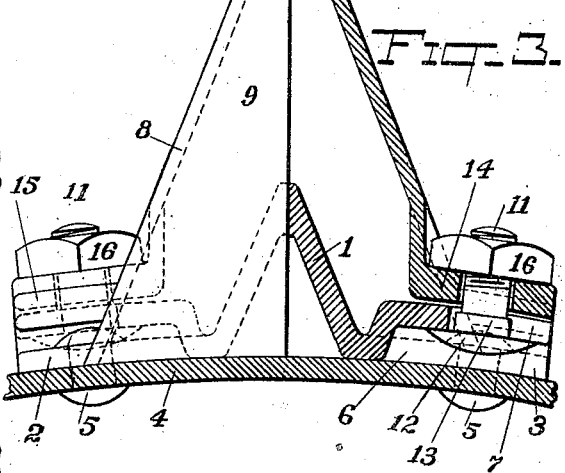
Figure 3 is a side elevation of Figure 2 but in part section.

The shallow lug 1 is provided with oppositely disposed flanges 2 and 3 adapted to fit snugly on a tire 4 and securely held thereon by suitable rivets 5. Each flange is constructed with a central recess 6, shown more fully in Figures 2 and 3 and in dotted lines in Figure 1, and each recess has an extended notch 7.

The lug 8, is wedge shaped and hollow to enclose the lug 1. The sides 9 and 10 of the lug 8 incline upwardly, and part of the edge of the lug is beveled, as shown, to prevent interference with any part of a machine upon which the wheel carrying the lug may be mounted. The lower edges of the sides 9 and 10 are adapted to fit snugly on the tire 4 and are held securely by bolts 11. The heads 12 of the bolts 11 are adapted to hold within the recesses 6 respectively, the stems of the bolts having enlarged squared portions 13, adjacent the heads, to fit within the notches 7 and prevent the bolts from turning.

The forward and rear sides of the lug 8 are cut away at the bottoms thereof, to accommodate the flanges 2 and 3 of the lug 1; flanges 14 and 15, integral with the lug 8, project outwardly over the flanges 2 and 3 of the lug 1 and are provided with suitable perforations through which the stems of the bolts 11 extend and are held securely in place by nuts 16.

The lugs 1 are permanently attached to the tire 4, and the lugs 8 are only used in case the ground is soft or not of sufficient firmness for a wheel to grip without slipping. The lug 8 is quickly and readily attachable over the lug 1, and as the flanges 14 and 15 do not contact with the flanges 2 and 3 of the lug 1 the lower edges of the sides 9 and 10 are held in rigid contact with the tire 4. By loosening the nuts 16 the bolts 11 can be readily displaced and the lug 8 removed when desired.

What I claim is—

1. The combination of a wheel tire, a lug permanently mounted thereon, a supplemental lug, means to secure the supplemental lug to the permanent lug, said supplemental lug having two opposite sides adapted to contact with the tire.

2. The combination of a wheel tire, a permanent lug having opposed flanges secured to the tire, a supplemental lug adapted to be superimposed on the permanent lug and having opposed flanges, and means to secure the flanges of the supplemental lug to the flanges of the permanent lug.

3. The combination of a wheel tire, a permanent lug having opposed flanges secured to the tire, a supplemental lug adapted to be superimposed on the permanent lug and having opposed flanges, and bolts extending through the flanges of both lugs to secure the lugs together.

4. The combination of a wheel tire, a permanent lug having opposed flanges secured to the tire, recesses in said flanges, a supplemental lug adapted to be superimposed on the permanent lug and having opposed flanges, and bolts extending through the flanges of both lugs and having their heads held in said recesses.

5. The combination of a wheel tire, a permanent lug having opposed flanges secured to the tire, recesses in said flanges, a supplemental lug adapted to be superimposed on the permanent lug and having opposed flanges, notches in the flanges of the permanent lug and opening into said recesses, bolts having their heads in said recesses and extended through said notches and the flanges of the supplemental lug, and adapted to hold said lugs in rigid relation.

6. The combination of a wheel tire, a lug permanently mounted thereon, a supplemental lug, means to secure the supplemental lug to the permanent lug, said supplemental lug having two opposite sides contacting with the tire, and a bevel extending from one of said sides to the edge of the lug.

NICHOLAS R. NELSON.